United States Patent
Isgar

(10) Patent No.: US 11,729,267 B2
(45) Date of Patent: *Aug. 15, 2023

(54) PHOTOGRAPH SHARING SYSTEM

(71) Applicant: Charles Isgar, Scottsdale, AZ (US)

(72) Inventor: Charles Isgar, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/467,724

(22) Filed: Sep. 7, 2021

(65) Prior Publication Data

US 2021/0409493 A1 Dec. 30, 2021

Related U.S. Application Data

(63) Continuation-in-part of application No. 16/365,389, filed on Mar. 26, 2019, now Pat. No. 11,115,470, which is a continuation of application No. 15/996,362, filed on Jun. 1, 2018, now Pat. No. 10,277,679.

(60) Provisional application No. 62/609,454, filed on Dec. 22, 2017.

(51) Int. Cl.
| | |
|---|---|
| *H04L 67/1097* | (2022.01) |
| *H04L 67/565* | (2022.01) |
| *H04W 88/02* | (2009.01) |
| *H04N 1/00* | (2006.01) |
| *H04N 23/69* | (2023.01) |
| *H04N 23/63* | (2023.01) |
| *H04L 67/12* | (2022.01) |

(52) U.S. Cl.
CPC ........ *H04L 67/1097* (2013.01); *H04L 67/565* (2022.05); *H04N 1/00* (2013.01); *H04N 23/635* (2023.01); *H04N 23/69* (2023.01); *H04L 67/12* (2013.01); *H04W 88/02* (2013.01)

(58) Field of Classification Search
CPC .............. H04L 67/1097; H04L 67/12; H04N 5/232945; H04N 5/23296; H04N 7/015; H04N 7/247; H04N 7/44; H04W 88/02; G06Q 30/0643; G06Q 30/0639
USPC ........................................................ 709/204
See application file for complete search history.

(56) References Cited

U.S. PATENT DOCUMENTS

| | | | |
|---|---|---|---|
| 9,342,806 B2* | 5/2016 | Urban ............ | G06Q 10/063114 |
| 11,115,470 B1* | 9/2021 | Isgar ........................ | H04N 1/00 |
| 2004/0109199 A1 | 6/2004 | Tsubaki | |
| 2005/0254505 A1 | 11/2005 | Chang et al. | |
| 2008/0316225 A1* | 12/2008 | Sylthe .................. | G06T 3/4092 |
| | | | 345/620 |
| 2011/0211753 A1* | 9/2011 | Lee ........................ | H04N 1/387 |
| | | | 382/164 |
| 2011/0256886 A1 | 10/2011 | Velusamy | |
| 2012/0063736 A1 | 3/2012 | Simmons et al. | |
| 2013/0073420 A1* | 3/2013 | Kumm ............... | G06Q 30/0601 |
| | | | 705/26.8 |
| 2013/0215116 A1* | 8/2013 | Siddique ................ | G06Q 20/40 |
| | | | 705/26.7 |
| 2013/0222369 A1* | 8/2013 | Huston ................. | G06F 16/954 |
| | | | 345/419 |

(Continued)

*Primary Examiner* — Tauqir Hussain
(74) *Attorney, Agent, or Firm* — Schmeiser, Olsen & Watts LLP

(57) ABSTRACT

A photograph sharing system is described. The photograph sharing system allows for contributors to upload photographs of an event. Contributors or other application users may select an uploaded photograph in a desired section and digitally zoom in on a desired individual in that section and then download the zoomed in photograph.

3 Claims, 3 Drawing Sheets

(56) References Cited

U.S. PATENT DOCUMENTS

| | | | |
|---|---|---|---|
| 2014/0032596 A1* | 1/2014 | Fish | G09B 7/00 |
| | | | 707/770 |
| 2014/0285634 A1* | 9/2014 | Rhoads | G06T 3/4038 |
| | | | 348/47 |
| 2014/0354768 A1* | 12/2014 | Mei | H04N 5/23222 |
| | | | 348/36 |
| 2015/0019643 A1* | 1/2015 | Balassanian | G06F 15/17306 |
| | | | 709/204 |
| 2015/0081791 A1* | 3/2015 | Jacobs | H04L 67/06 |
| | | | 709/204 |
| 2016/0140934 A1* | 5/2016 | Frieder | G11B 27/34 |
| | | | 345/156 |
| 2016/0205358 A1* | 7/2016 | Dickinson | H04N 7/181 |
| | | | 348/157 |
| 2016/0253743 A1* | 9/2016 | David | G06Q 30/0601 |
| | | | 705/27.2 |
| 2022/0171801 A1* | 6/2022 | Frieder | H04N 1/00 |
| 2023/0034018 A1* | 2/2023 | Cheong | H04W 4/38 |

* cited by examiner

PHOTOGRAPH SHARING SYSTEM

CROSS REFERENCE TO RELATED APPLICATION[S]

This application is a continuation-in-part of U.S. patent application entitled "PHOTOGRAPH SHARING SYSTEM," Ser. No. 16/365,389, filed Mar. 26, 2019, which is a continuation of earlier filed U.S. patent application entitled, "PHOTOGRAPH SHARING SYSTEM," Ser. No. 15/996,362, filed Jun. 1, 2018, now U.S. Pat. No. 10,277,679 issued Apr. 19, 2019, which claims priority to U.S. Provisional patent application entitled "PHOTOGRAPH SHARING SYSTEM," Ser. No. 62/609,454, filed Dec. 22, 2017, the disclosure of which is hereby incorporated entirely herein by reference.

BACKGROUND OF THE INVENTION

Technical Field

This invention relates to a photograph sharing system particularly a photograph sharing system using digital photography.

State of the Art

There are often many photographs taken at major events, such as sporting events, concerts and/or festivals. Access to certain photographic shots is often varied. Accordingly, a photo sharing system to share photographs with others who might want to view and download is needed.

SUMMARY OF EMBODIMENTS

Disclosed is a photograph sharing system comprising: a computer server for running an application; and at least one contributor computing device operated by a contributor and configured for taking at least one photograph, wherein the at least one photograph is uploaded and available to be viewed and zoomed in on by at least one application user. The zoomed in on at least one photograph may be downloaded. The at least one contributor may be different from the at least one application user.

Disclosed is a method of using a photograph sharing system comprising: taking a photograph at an event, wherein the at least one photograph is taken by at least one contributor; uploading the at least one photograph to an application; searching by at least one application user for the at least one photograph in a desired section of the event; and zooming in on the at least one photograph in the desired section. The method may further comprise downloading the zoomed in on at least one photograph. The at least one contributor may be different from the at least one application user.

Also disclosed is a photograph sharing system comprising: a computer server having a memory storing photographs uploaded by a plurality of users; and a plurality of contributor mobile computing devices coupled to the computer server, each computer mobile computing device operated by contributor to take photographs, wherein the computer server is programmed to: receive from the plurality of contributor mobile computing devices photographs taken by the plurality of contributor mobile computing devices and automatically store the photographs; receive from the plurality of contributor mobile computing devices location information of the plurality of contributor mobile computing devices, wherein the location information is stored on the computer server and associated with all photographs uploaded to the computer server from each particular contributor mobile computing device; display for viewing to the plurality of contributor mobile computing devices all of the photographs stored in the computer server; receive from one contributor mobile computing device of the plurality of contributor mobile computing devices a signal including location information of the one contributor mobile computing device and automatically process the information and access the location information stored in the computer server; and automatically determine photographs stored in the computer server associated with the location information of the one contributor mobile computing device.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
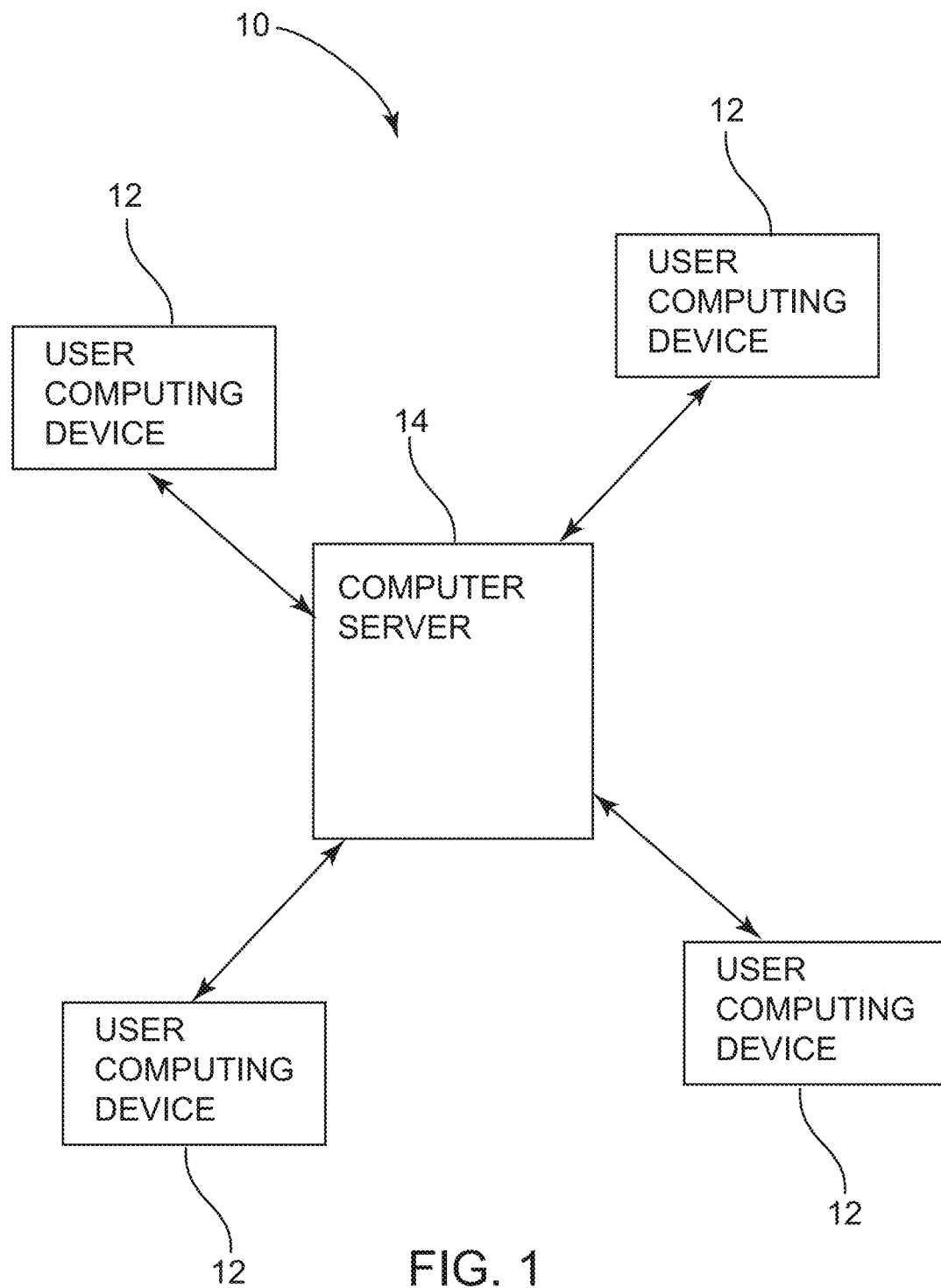
FIG. 1 is a diagrammatic view of a social media final notification system according to an embodiment.

The photograph sharing system as described herein provides a user to zoom in on their preferred selection of photograph based on an ecosystem of contributed images. Referring to the drawings, FIG. 1 depicts an embodiment of a photograph sharing system 10. The system 10 may include user computing devices 12 and a computer server 14, wherein the user computing device 12 are coupled to the computer server 14. This coupling may be a network connection, such as through an Internet connection, wherein the user computing devices 12 may communicate with and receive communication from the server 14.

In operating the system 10, for example, a user on one side of a stadium event can get a photograph from a user on the other side of the stadium event and vice versa. No prior knowledge of other users is required. Embodiments may provide for crowd sourcing of photographs allowing users to find photos from various contributors at the same event or venue. Users contribute their photographs to an application or system that utilizes zooming in to find the preferred photograph selection. Users include contributors and application users. Contributors may be professional photographers from an event or non-professional contributors. An application, as used herein, may include a mobile application and/or website.

The users get access to photographs through the application utilizing digital zooming from an aggregate photography collection. The application platform allows users to select and crop their selections utilizing digital imagery. Commercial applications for businesses include collection of data from machine learning and big data, for example how many fans in the stadium are wearing a certain brand shirt. Big data, as used herein, includes data sets that are so large or complex that traditional data processing applications are inadequate.

Figure 2:
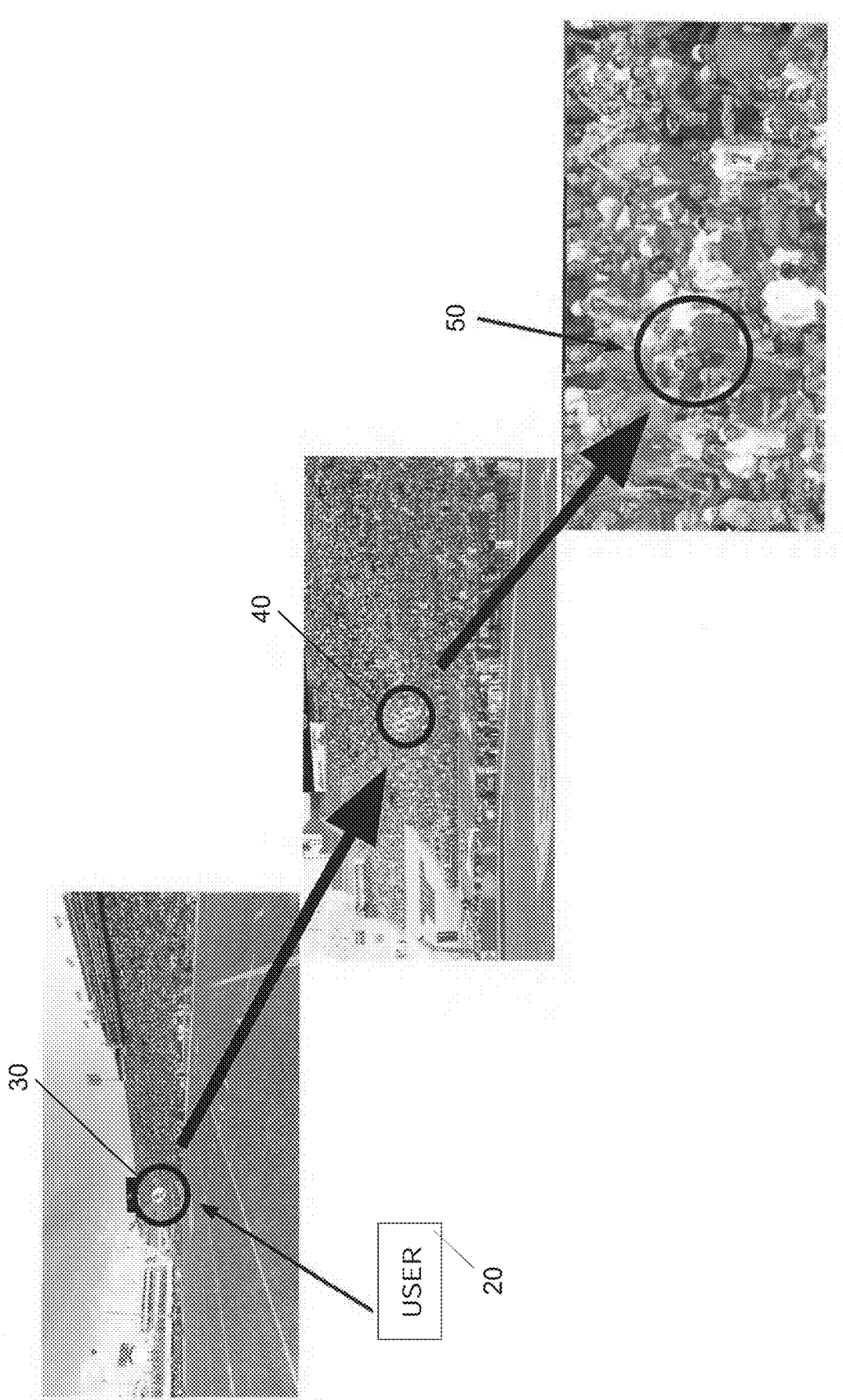
FIG. 2 is an illustration of a method of using the photograph sharing system according to an embodiment.

In the method as shown in FIG. 2, a user (contributor) 20 takes a photograph with a contributor device 12 at an event and/or in a venue, wherein the contributor device may be mobile computing device, a camera, a fixed camera at the venue and the like. Once the photograph 30 is uploaded, a user (application user) can then zoom in 40 on a desired section of the stadium and zoom in even further 50 on the same section of the stadium to see faces of the desired subjects in the crowd.

Contributor devices configured for taking at least one photograph, include cell phones, tablets, cameras, video recorders, fixed venue cameras and the like. This system allows for crowd sourcing of photographs and allows for photos with depth and perception that are not arms-length, such as when taking selfies. Further, it is possible to capture a more candid photograph by finding a photograph at the right angle and timing that captures the human behavior in the moment, such as, but not limited to cheering for a band, cheering for a sporting event, and the like.

The computer server 14 may include a memory storing photographs uploaded by users and storing an application that provides programmed instruction to the computer server when the application is executed. The application may have identification features utilizing artificial intelligence to locate desired individuals that application user is searching for, such as movie stars, suspects and/or yourself. The application may be configured to have rating features, for example, whether other application users like a photograph. The application may also be configured to earn points and/or rewards for contributors based on application users downloading and/or liking a contributor's uploaded photograph.

The application is useful for users to view/download special photographs from a memorable game, concert, festival and the like that the user was unable to photograph on his/her own. The application offers a user an opportunity to see themselves at the event. A contributor can take a photograph of a certain section at an event and upload it to the application platform. Application users seated in that section can search for photos of their section.

Figure 3:
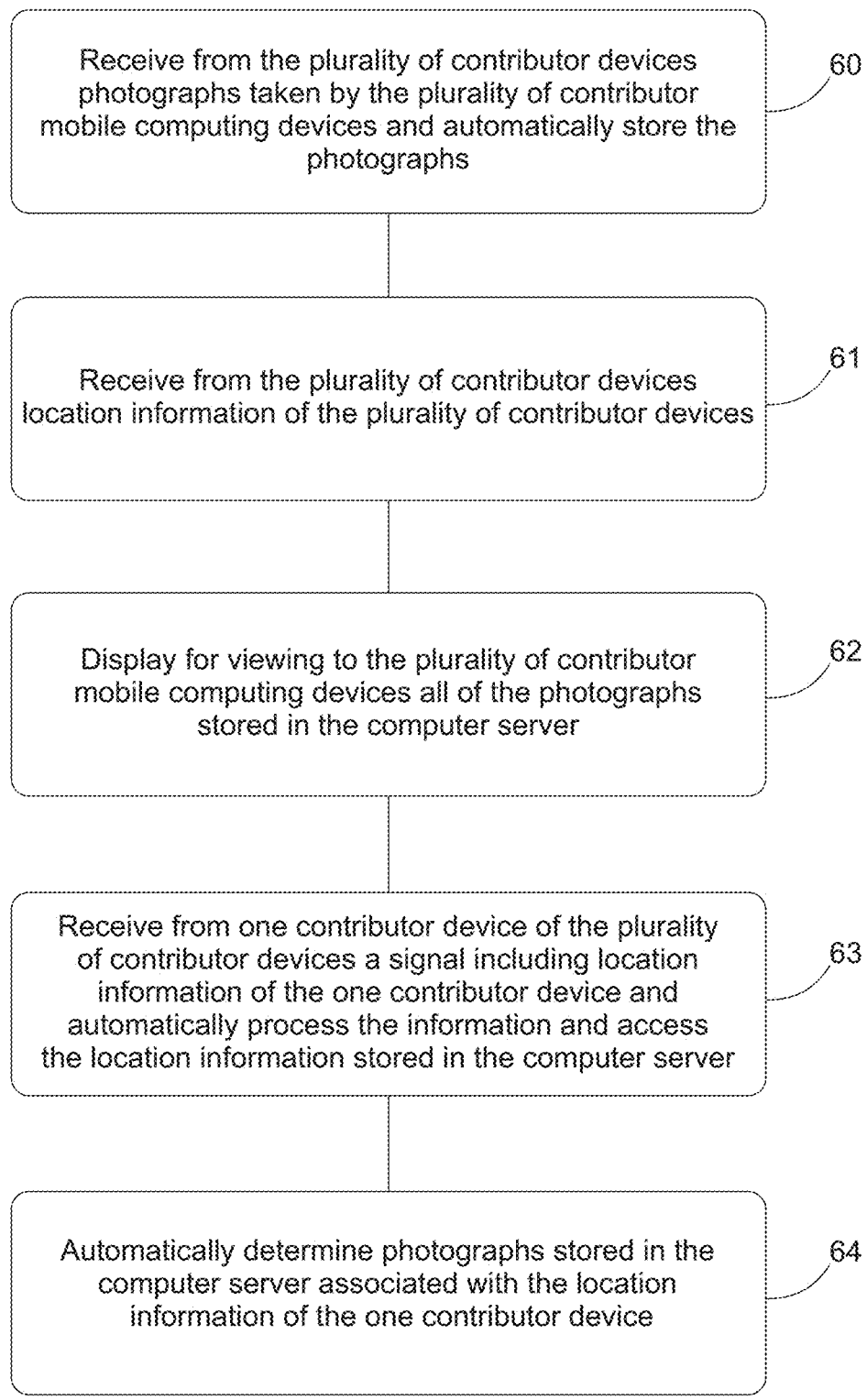
FIG. 3 is a flow chart depicting the programming of a computer server operating in photograph sharing system according to an embodiment.

Another embodiment includes a photograph sharing system comprising: a computer server 14 having a memory storing photographs uploaded by a plurality of users; and a plurality of contributor devices 12 coupled to the computer server, each contributor device 12 operated by contributor to take photographs. Referring to FIG. 3, the computer server 14 may be programmed to: receive from the plurality of contributor devices photographs taken by the plurality of contributor mobile computing devices and automatically store the photographs (Step 60); receive from the plurality of contributor devices location information of the plurality of contributor devices (Step 61), wherein the location information is stored on the computer server and associated with all photographs uploaded to the computer server from each particular contributor device; display for viewing to the plurality of contributor mobile computing devices all of the photographs stored in the computer server (Step 62); receive from one contributor device of the plurality of contributor devices a signal including location information of the one contributor device and automatically process the information and access the location information stored in the computer server (Step 63); and automatically determine photographs stored in the computer server associated with the location information of the one contributor device (Step 64).

The computer server may be further programmed to send instructions for automatic execution to the one contributor device to display the photographs associated with the location information of the one computing device. In embodiments, the one contributor device performs zooming in operations on any of the photographs associated with the location information of the one contributor device that is displayed on the one contributor device.

The computer server may be further programmed to receive from the one contributor device a request for download of a photograph that has been zoomed in on by the one contributor device; to automatically create a downloadable zoomed in photograph in response to receiving the request from the one contributor device; to automatically create the downloadable zoomed in photograph further comprises creating the downloadable zoomed in photograph having a same zoom in percentage as the one contributor device was zoomed in at the time of requesting the for download the zoomed in photograph; to send instructions for automatic execution to the one contributor device to display the created zoomed in photograph and an activation button to activate download of the created zoomed in photograph; and/or to automatically send a file containing the created zoomed in photograph in response to receiving from the one contributor device a signal indicating activation of the download.

Embodiments may be available on or through the internet, such as through domain names reserved and owned by Applicant that include stadiumzoom.com, arenazoom.com, or the like.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, cloud-based infrastructure architecture, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A photograph sharing system comprising:
   a computer server having a memory storing photographs with associated photograph location information, the photographs with associated photograph location information provided by a plurality of contributors using contributor mobile computing devices; and
   at least one user device coupled to the computer server, wherein the computer server is programmed to:
   receive from the at least one user device an indication of location information and automatically process the location information and access the photograph location information stored in the computer server corresponding to the received location information;
   automatically determine the photographs stored in the computer server associated with the accessed photograph location information;
   send instructions for automatic execution to the at least one user device to display the photographs associated with the accessed photograph location information;
   receive a request for download of a selected photograph that has been edited by the at least one user computing device by cropping and zooming in a zoom percentage; and
   automatically create a downloadable zoomed in photograph in response to receiving the request from the at least one user device, wherein creating the downloadable zoomed in photograph further comprises creating the downloadable zoomed in photograph having a same cropping and zoom in percentage as in the request by the at least one user device; and
   wherein the downloadable zoomed in photograph is downloaded by the at least one user device.

2. The photograph sharing system of claim 1, wherein the at least one user device is operated by at least one application user.

3. The photograph sharing system of claim 1, wherein the at least one contributor is different from the at least one application user.

\* \* \* \* \*